(12) United States Patent
Takahashi et al.

(10) Patent No.: US 8,820,753 B2
(45) Date of Patent: Sep. 2, 2014

(54) LUBRICANT SEALING STRUCTURE FOR GEAR COUPLING

(75) Inventors: Fumiharu Takahashi, Nagasaki (JP); Akihiko Yano, Nagasaki (JP); Katsuhiko Shoda, Nagasaki (JP); Hisao Miyake, Nagasaki (JP); Shin Koga, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 195 days.

(21) Appl. No.: 13/094,289

(22) Filed: Apr. 26, 2011

(65) Prior Publication Data

US 2012/0274033 A1    Nov. 1, 2012

(51) Int. Cl.
*F16J 15/02*    (2006.01)

(52) U.S. Cl.
USPC ........... 277/637; 277/650; 277/640; 277/630; 277/628

(58) Field of Classification Search
USPC .......................... 277/628, 637, 630, 640, 650
See application file for complete search history.

(56) References Cited

U.S. PATENT DOCUMENTS

| | | |
|---|---|---|
| 4,639,200 A | 1/1987 | Baumgardner et al. |
| 6,283,869 B1 | 9/2001 | Spensberger |

FOREIGN PATENT DOCUMENTS

| | | |
|---|---|---|
| JP | S48-72547 | 9/1973 |
| JP | U-H05-088701 | 12/1993 |
| JP | U-H07-014226 | 3/1995 |
| JP | 2000-503750 | 3/2000 |
| JP | 2003-343591 | 12/2003 |
| JP | 2006-83962 | 3/2006 |

OTHER PUBLICATIONS

Japan Patent Office, "Decision to Grant a Patent for JP 2008-278057", Aug. 17, 2012.

*Primary Examiner* — Kristina Fulton
*Assistant Examiner* — Eugene G Byrd
(74) *Attorney, Agent, or Firm* — Manabu Kanesaka; Kenneth M. Berner; Benjamin J. Hauptman

(57) ABSTRACT

Disclosed is a lubricant sealing structure for a gear coupling, which can firmly prevent the leaking of the lubricant due to vibration or the like in the axial and radial directions inside the gear coupling. A sealing member is a cloth-inserted rubber 21 having flexibility. The cloth-inserted rubber 21 has a first end being fixed to a fixing member 24s on a cover plate 20 mounted on a side of an outer ring 7 and a second end being fixed to another fixing member 25s on a side of the drive shaft 10 in liquid tight manner in the axial direction of a drive shaft 10. Each of the first and second ends of the cloth-inserted rubber 21 has a face extending in a direction that is perpendicular to the axial direction. The cloth-inserted rubber 21 seals the lubricant at the face of said each of the first and second ends.

18 Claims, 5 Drawing Sheets

LUBRICANT SEALING STRUCTURE FOR GEAR COUPLING

TECHNICAL FIELD

The present invention relates to a lubricant sealing structure for a gearbox or the like of a wind turbine. The lubricant sealing structure includes a gear coupling having an outer ring formed with internal teeth and a drive shaft formed with external teeth meshing with the internal teeth of the outer ring. The gear coupling has an interior space with a lubricant storage part for lubricant such as oil and grease. The lubricant storage space is sealed by a sealing member disposed between the outer ring and the drive shaft to prevent the lubricant from leaking.

BACKGROUND ART

FIG. 6 is a schematic sectional view taken along a shaft center of a drive mechanism of a wind turbine. In FIG. 6, a plurality of blades (normally three to five blades) are rotatably mounted on a rotor head 3 via a bearing 2. The rotation of the blades 1 are transmitted to the rotor head 3. A first inner ring 5 is connected to the rotor head 4 via a plurality of bolts 4. The rotation of the rotor head 3 is transmitted to the first inner ring 5 via the bolts 4.

The gear coupling 07 is configured by meshing simultaneously the outer ring 7 with the internal teeth, the first inner ring 5 with the external teeth meshing with the internal teeth of the outer ring 7, and a second inner ring formed with external teeth. The outer ring 7 is not fixed to any of the parts but is prevented from coming out in the axial direction of the outer ring 7 by means of the rotor head 3 and a cover plate 20. The cover plate 20 is described in detail later.

A bearing sleeve 8 fixed to an outer circumferential part of the rotor head 3 is supported in a casing 15 via a main bearing 9. The casing 15 is supported on a tower via a bearing 17.

In the gear coupling 07, the external teeth of the first inner ring 5 and the internal teeth of the outer ring 7 mesh with each other and the internal teeth of the outer ring 7 and the external teeth of the second inner ring 6 mesh with each other so as to transmit the rotation to the drive shaft 10 via a plurality of bolts 16 while the second inner ring 6 functions as an output end. In this manner, the rotation of the rotor head 3 is transmitted to the drive shaft 10 via the gear coupling 07 and thus, the gear coupling 07 can absorb axial misalignment of the rotor head 3 and the drive shaft 10 and the movement of the rotor head 3 and the drive shaft 10 in the axial direction due to thermal expansion difference caused by temperature difference between the rotor head 3 and the drive shaft 10 as well as the vibration transmitted to the drive shaft 10 from the rotor head 3.

The rotation of the drive shaft 10 is transmitted to a step-up gear 11 to increase the speed by a prescribed ratio, thereby driving a generator 13.

An interior space 12 is formed inside the gear coupling 07 (12s is a cover/a sealing member). An exterior space 19 is formed outside of the outer ring 7. The lubricant such as grease, oil or the like is housed in the interior space 12 and the exterior space 19.

FIG. 7 shows an exemplary case of a conventional sealing member for a lubricant storage part 19s consisting of the interior space 12 and the exterior space 19.

In FIG. 7, a cloth-inserted rubber sheet 21 is made of cloth and rubber. The cover plate 20 on the side of the bearing sleeve 8 is fixed to the bearing sleeve 8 by a plurality of bolts (unshown). One end of the cloth-inserted rubber sheet 21 is fixed to the cover plate 20 on an inner circumferential side thereof via a stopper plate 23 and a rubber member 22 by a bolt. The cloth-inserted rubber sheet 21 is bent at a right angle and its other end is fixed to a top surface of the drive shaft 10 via a rubber member 22a.

The other end of the of the cloth-inserted rubber sheet 21 is firmly fixed to the top surface of the drive shaft 10 by applying contact pressure by means of an iron band 41. The iron band is retained by fixing a retaining plate by a bolt 25.

In this manner, leaking of the lubricant such as grease and oil is prevented in the interior space 12 formed inside of the gear coupling 07 and the exterior space 19s of the outer ring 7.

Patent Document 1 (JP5-88701 Utility Model) discloses a device for preventing the lubricant of the gear coupling from leaking.

Patent Document 2 (JP7-14226 Utility Model) proposes to prevent compression set and leaking of the lubricant due to compressibility fluctuation of an O-ring of the gear coupling.

[PATENT DOCUMENT 1] JP5-88701U (Published Utility Model Application)

[PATENT DOCUMENT 2] JP7-14226U (Published Utility Model Application)

SUMMARY OF INVENTION

In FIG. 6, the gear coupling 07 includes the outer ring formed with internal teeth, the first inner ring 5 formed with external teeth meshing with the internal teeth of the outer ring 7, the second inner ring 6 formed with external teeth and the drive shaft 10 fixed to the second inner ring 6. The rotor head 3 and the drive shaft 10 move relative to each other in the radial and axial directions due to the axial misalignment thereof, the axial movement due to the thermal expansion difference, the vibration from the rotor head 3 and so on.

Therefore, with use of the sealing member for the lubricant of the interior space 12 and the exterior space 19, relative displacement occurs in the radial and axial directions between a cover plate 20 fixed to the rotor head 3 via the bearing sleeve 8 and the cloth-inserted rubber sheet 21 fixed to the drive shaft 10.

With use of the sealing member for the lubricant, if the surface of the iron band 41 fixed to the top surface of the drive shaft 10 looses its contact pressure due to vibration or causes sliding, the sealing effect of the cloth-inserted rubber sheet 21 becomes insufficient, often causing the lubricant to leak.

The leaking of the lubricant leads to instability of a work platform and leaking of the lubricant around the tower 18.

In view of the problems of the related art, it is an object of the present invention is to provide a lubricant sealing structure for a gear coupling, the sealing structure being capable of firmly preventing the leaking of the lubricant due to movements such as vibration in the axial and radial directions of the drive shaft inside the gear coupling.

To achieve the abject of the present invention, the present invention provides a lubricant sealing structure for a gear coupling which includes an outer ring formed with internal teeth and a drive shaft formed with external teeth meshing with the internal teeth of the outer ring and has an interior space storing lubricant for the internal teeth and the external teeth. The lubricant sealing structure may include, but is not limited to, a sealing member having flexibility; a cover plate which covers a side surface of the outer ring; a first fixing member which fixes a first end of the sealing member to the cover plate in a liquid-tight manner by pressing the first end of the sealing member against the cover plate in an axial direction of the drive shaft; and a second fixing member which fixes a second end of the sealing member to one of the drive shaft and a stopper plate secured to the drive shaft in a liquid-tight manner by pressing the second end of the sealing member against the one of the drive shaft and the stopper plate in the axial direction of the drive shaft. Each of the first and second ends of the sealing member has a face extending in a direction that is perpendicular to the axial direction of the drive shaft. The sealing member seals the lubricant stored in the interior space at the face of said each of the first and second ends.

In the above sealing structure, it is preferable that the second fixing member fixes the second end of the sealing member to the drive shaft and the first fixing member is displaced outwardly in a radial direction of the drive shaft with respect to the second fixing member and displaced in the axial direction of the drive shaft with respect to the second fixing member. The sealing member is a cloth-inserted rubber sheet made of rubber and cloth, and the cloth-inserted rubber sheet extends inwardly in the radial direction of the drive shaft from the first fixing member, then the cloth-inserted rubber sheet is bent to extend in the axial direction of the drive shaft, and then the cloth-inserted rubber sheet is bent again to extend inwardly in the radial direction of the drive shaft to reach the second fixing member.

In this structure, it is also preferable to provide a rubber member at least one of between the first fixing member and the cover plate and between the second fixing member and the drive shaft.

In the above lubricant structure, it is preferable that the second fixing member fixes the second end of the sealing member to the drive shaft, the first fixing member is displaced outwardly in a radial direction of the drive shaft with respect to the second fixing member and displaced in the axial direction of the drive shaft with respect to the second fixing member, the sealing member is a cloth-inserted rubber sheet made of rubber and cloth, and the cloth-inserted rubber sheet extends inwardly in the radial direction of the drive shaft from the first fixing member, then the cloth-inserted rubber sheet is bent to extend in the axial direction of the drive shaft while curving in an S-shape, and then the cloth-inserted rubber sheet is bent again to extend inwardly in the radial direction of the drive shaft to reach the second fixing member.

In this structure, it is also preferable to provide a rubber member at least one of between the first fixing member and the cover plate and between the second fixing member and the drive shaft.

In the above lubricant sealing structure for the gear coupling, it is preferable that the second fixing member fixes the second end of the sealing member to the stopper plate that extends outwardly in the radial direction from the drive shaft, the second fixing member being positioned outwardly in a radial direction of the drive shaft with respect to the drive shaft, the first fixing member is displaced in both of the radial and axial directions of the drive shaft with respect to the second fixing member, the sealing member is a cloth-inserted rubber sheet made of rubber and cloth, and the cloth-inserted rubber sheet extends inwardly in the radial direction of the drive shaft from the first fixing member, then the cloth-inserted rubber sheet is bent to extend in the axial direction of the drive shaft, and then the cloth-inserted rubber sheet is bent again to extend outwardly in the radial direction of the drive shaft to reach the second fixing member.

In this structure, it is preferable to provide an O-ring between the stopper plate and the drive shaft, the stopper plate extending outwardly in the radial direction from the drive shaft and also that the second fixing member is positioned outwardly in a radial direction of the drive shaft with respect to the drive shaft to fixes the second end of the sealing member to the stopper plate. It is also preferable to provide a rubber member at least one of between the first fixing member and the cover plate and between the second fixing member and the one of the drive shaft and the stopper plate.

In the above lubricant sealing structure for the gear coupling, the second fixing member fixes the second end of the sealing member to the stopper plate that extends outwardly in the radial direction from the drive shaft, the second fixing member being positioned outwardly in a radial direction of the drive shaft with respect to the drive shaft, the first fixing member is displaced in both of the radial and axial directions of the drive shaft with respect to the second fixing member, the sealing member is a sponge-rubber member which is made of a sponge material and a rubber material surrounding the sponge material and has a rectangular cross-sectional shape, the sponge-rubber member is interposed between the cover plate and the stopper plate so that the sponge-rubber member extends in the axial direction of the drive shaft, and the stopper plate works as the first fixing member and the cover plate works as the second fixing member.

The above lubricant sealing structure may further include an O-ring provided between the stopper plate and the drive shaft, the stopper plate extending outwardly in the radial direction from the drive shaft. The second fixing member may be positioned outwardly in a radial direction of the drive shaft with respect to the drive shaft to fixes the second end of the sealing member to the stopper plate.

In the above lubricant sealing structure, it is preferable that the first and second fixing members are substantially arranged in a plane perpendicular to the axial direction of the drive shaft, the sealing member is a cloth-inserted rubber sheet made of rubber and cloth, and the cloth-inserted rubber sheet curves to protrude in the axial direction of the drive shaft between the first end and the second end.

It is also preferable to provide a rubber member at least one of between the first fixing member and the cover plate and between the second fixing member and the one of the drive shaft and the stopper plate.

According to the present invention, the first fixing member fixes a first end of the sealing member to the cover plate in a liquid-tight manner by pressing the first end of the sealing member against the cover plate in an axial direction of the drive shaft and the second fixing member fixes a second end of the sealing member to one of the drive shaft and a stopper plate secured to the drive shaft in a liquid-tight manner by pressing the second end of the sealing member against the one of the drive shaft and the stopper plate in the axial direction of the drive shaft. Each of the first and second ends of the sealing member has a face extending in a direction that is perpendicular to the axial direction of the drive shaft. The sealing member seals the lubricant stored in the interior space at the face of said each of the first and second ends.

This structure does not require the iron band as in the case of the related art in which the iron band is fixed to the top surface of the drive shaft while applying tensional force and the relative movement in the radial and axial directions. By not using the iron band, it is possible to avoid loosening and sliding of the iron band due to the vibration of the surface caused by the relative movement in the radial and axial directions.

Particularly, each of the first and second ends of the sealing member has a face extending in a direction that is perpendicular to the axial direction of the drive shaft. The sealing member seals the lubricant stored in the interior space at the face of said each of the first and second ends. By this, it is possible to avoid the time-related deterioration of the contact pressure of the iron band, which causes the sliding on the outer circumferential surface of the drive shaft 10 in the axial direction as in the case of the related art using the iron band along the outer circumferential surface of the drive shaft.

The sealing member is a cloth-inserted rubber sheet made of rubber and cloth and the cloth-inserted rubber sheet extends inwardly in the radial direction of the drive shaft from the first fixing member, then the cloth-inserted rubber sheet is bent to extend in the axial direction of the drive shaft, and then the cloth-inserted rubber sheet is bent again to extend inwardly in the radial direction of the drive shaft to reach the second fixing member.

This allows the cloth-inserted rubber sheet to absorb the relative movement between the cover plate and the drive shaft in the axial and radial directions. The fixing members are vibrationally-independent and thus, restrain of the fixing members does not affect the cloth-inserted rubber sheet. The sealing effect of the cloth-inserted rubber sheet becomes sufficient and the leaking of the lubricant can be prevented. The fixing members are connected by the cloth-inserted rubber that is bent in the manner described above, and thus, the relative movement of the cover plate and the drive shaft in the radial and axial directions can be absorbed by the cloth-inserted rubber.

Further, the rubber member is provided at least one of between the first fixing member and the cover plate and between the second fixing member and the one of the drive shaft and the stopper plate. Thus, each of the fixing part can obtain rigidity and flexibility. As a result, the sealing effect on the plane perpendicular to the axial direction can be firmly achieved and the leaking of the lubricant can be prevented.

The sealing member is a cloth-inserted rubber sheet made of rubber and cloth, and the cloth-inserted rubber sheet extends inwardly in the radial direction of the drive shaft from the first fixing member, then the cloth-inserted rubber sheet is bent to extend in the axial direction of the drive shaft while curving in an S-shape, and then the cloth-inserted rubber sheet is bent again to extend inwardly in the radial direction of the drive shaft to reach the second fixing member.

This structure improves flexibility of the cloth-inserted rubber. As the fixing members are supported completely vibrationally-independent of each other. As a result, the sealing effect of the cloth-inserted rubber sheet becomes sufficient and it is possible to prevent the leaking of the lubricant.

The second fixing member fixes the second end of the sealing member to the stopper plate that extends outwardly in the radial direction from the drive shaft, the second fixing member being positioned outwardly in a radial direction of the drive shaft with respect to the drive shaft, the first fixing member is displaced in both of the radial and axial directions of the drive shaft with respect to the second fixing member, the sealing member is a cloth-inserted rubber sheet made of rubber and cloth, and the cloth-inserted rubber sheet extends inwardly in the radial direction of the drive shaft from the first fixing member, then the cloth-inserted rubber sheet is bent to extend in the axial direction of the drive shaft, and then the cloth-inserted rubber sheet is bent again to extend outwardly in the radial direction of the drive shaft to reach the second fixing member.

By this, it is possible to prevent the leaking of the lubricant with the combination of the flexibility of the cloth-inserted rubber and the vibrationally-independent structure of the fixing members.

The sealing effect of the O-ring provided between the stopper plate extending outwardly in the radial direction and the drive shaft enhances the sealing effect sufficiently and thus, it is possible to prevent the leaking of the lubricant more firmly.

The second fixing member fixes the second end of the sealing member to the stopper plate that extends outwardly in the radial direction from the drive shaft. The second fixing member is positioned outwardly in a radial direction of the drive shaft with respect to the drive shaft and the first fixing member is displaced in both of the radial and axial directions of the drive shaft with respect to the second fixing member. The sealing member is a sponge-rubber member which is made of a sponge material and a rubber material surrounding the sponge material and has a rectangular cross-sectional shape. The sponge-rubber member is interposed between the cover plate and the stopper plate so that the sponge-rubber member extends in the axial direction of the drive shaft. The stopper plate works as the first fixing member and the cover plate works as the second fixing member.

Specifically, the soft sponge material is surrounded by the rubber material with high flexibility and each of the first and second ends of the sponge-rubber member has a face extending in a direction that is perpendicular to the axial direction of the drive shaft. The sponge-rubber member prevents the lubricant from leaking.

The sealing effect of the O-ring provided between the stopper plate extending outwardly in the radial direction and the drive shaft enhances the sealing effect sufficiently and thus, it is possible to prevent the leaking of the lubricant more firmly.

The first and second fixing members are substantially arranged in a plane perpendicular to the axial direction of the drive shaft. The sealing member is a cloth-inserted rubber sheet made of rubber and cloth, and the cloth-inserted rubber sheet curves to protrude in the axial direction of the drive shaft between the first end and the second end.

By this, it is possible to prevent the leaking of the lubricant with the combination of the flexibility of the cloth-inserted rubber and the vibrationally-independent structure of the fixing members.

Further, the rubber member is provided at least one of between the first fixing member and the cover plate and between the second fixing member and the one of the drive shaft and the stopper plate. This enhances the flexibility of the cloth-inserted rubber to the movement in the axial and radial direction, and thus, the sealing effect on the plane perpendicular to the axial direction can be firmly achieved and the leaking of the lubricant can be prevented.

DESCRIPTION OF EMBODIMENTS

A preferred embodiment of the present invention will now be described in detail with reference to the accompanying drawings. It is intended, however, that unless particularly specified, dimensions, materials, shape, its relative positions and the like shall be interpreted as illustrative only and not limitative of the scope of the present invention.

Figure 6:
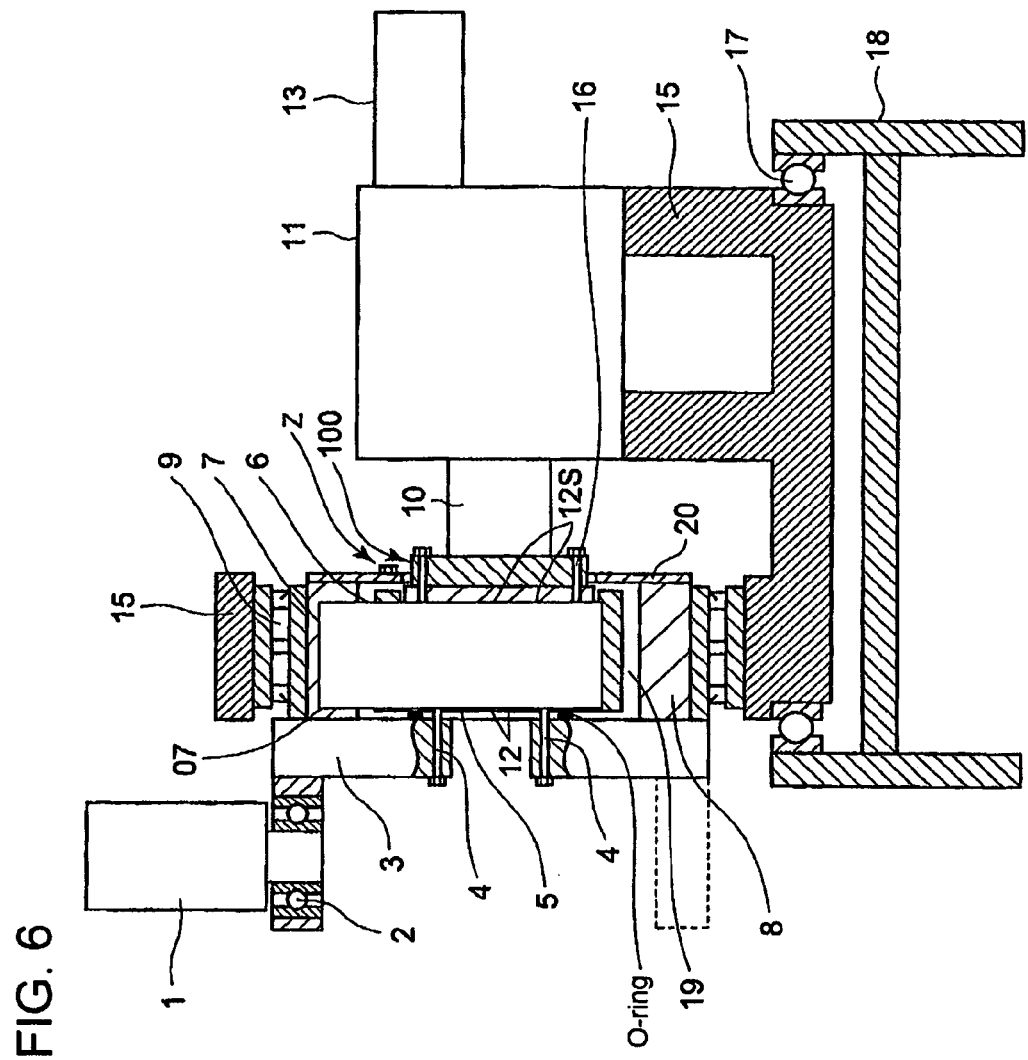
FIG. 6 is a schematic sectional view of a drive mechanism of a wind turbine to which the present invention is applicable along the axial center.

FIG. 6 is a schematic sectional view of a drive mechanism of a wind turbine to which the present invention is applicable along the axial center.

FIG. 6 shows a plurality of blades (normally three to 5 blades) mounted rotatably on a rotor head 3 via a bearing 2. The rotation of the blades 1 is transmitted to the rotor head 3.

A first inner ring 5 is connected to the rotor head 3 via a plurality of bolts 4. The rotation of the rotor head 3 is transmitted to the first inner ring 5 via the bolts 4.

An outer ring 7 is formed with internal teeth and the first inner ring 5 is formed with external teeth. A second inner ring 6 is formed with external teeth. A gear coupling 07 is configured such that the internal teeth of the outer ring 7 and the external teeth of the first inner ring 5 and the external teeth of the second inner ring 6 mesh all together. The outer ring 7 is not fixed to any of the parts but is prevented from coming out of axial alignment by the rotor head 3 and the cover plate 20.

A bearing sleeve 8 is fixed to an outer circumferential part of the rotor head 3. The bearing sleeve 8 is supported on a casing 15 via a main bearing 9. The casing 15 is supported on a tower 18 via a bearing 17.

The external teeth of the first inner ring 5 mesh with the internal teeth of the outer ring 7, and the internal teeth of the outer ring 7 mesh with the external teeth of the second inner ring 6 so that the second inner ring 6 is an output terminal in the gear coupling 07. The rotation of the output terminal is transmitted to a drive shaft 10 via a plurality of bolts 16. In this manner, the rotation of the rotor head 3 is transmitted to the drive shaft 10 via the gear coupling 07 and thus, the gear coupling 07 can absorb axial misalignment of the rotor head 3 and the drive shaft 10 and the movement of the rotor head 3 and the drive shaft 10 in the axial direction due to thermal expansion difference caused by temperature difference between the rotor head 3 and the drive shaft 10 as well as the vibration transmitted to the drive shaft 10 from the rotor head 3.

The rotation of the drive shaft 10 is transmitted to a gear box 11 to increase the speed at a prescribed rate and then drives a generator 13.

The lubricant such as grease and oil is stored in an interior space 19s formed in an inside space 12 formed inside of the gear coupling 07 with a cover 12s and an outside space 19 of the outer ring 7. The interior space 19s is described below in detail.

The present relation relates to a structure which prevents the lubricant from leaking from the storage part for the lubricant.

First Preferred Embodiment

Figure 1:
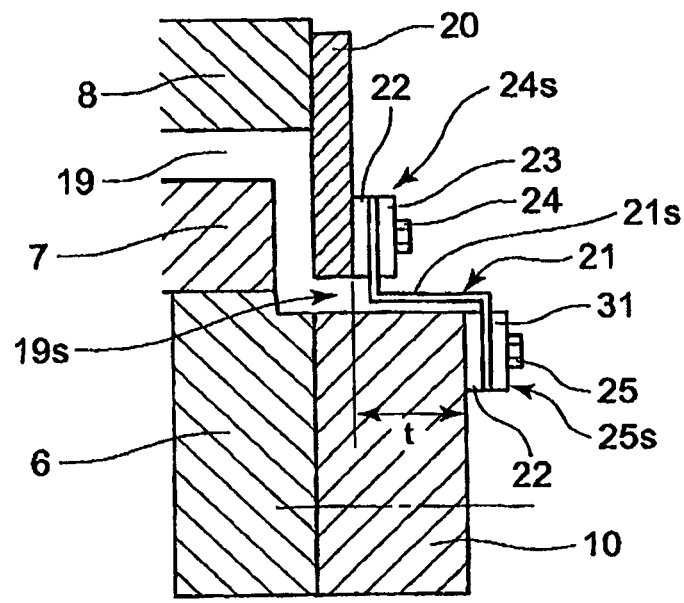
FIG. 1 is an enlarged view of a section Z of FIG. 6, illustrating a structure of a storage part for the lubricant in relation to a first preferred embodiment of the present invention.

FIG. 1 is an enlarged view of a section Z of FIG. 6, illustrating a structure of a storage part for the lubricant in relation to a first preferred embodiment of the present invention.

The gear coupling 07 includes the outer ring 7 formed with internal teeth and the drive shaft 10 formed with external teeth to mesh with the internal teeth of the outer ring 7. Specifically, the external teeth of the second inner ring 6 mesh with the internal teeth and the drive shaft 10 is fixed to the second inner ring 6 via the bolts 16. The gearing coupling 07 also includes the bearing sleeve 8.

The lubricant such as grease oil is stored in the interior space 19s which includes the inside space 12 and the outside space of the outer ring 7.

The cover plate 20 is fixed to the side of the bearing sleeve 8 by a plurality of bolts (unshown).

A fixing member 24s fixes the cover plate 20 fixed to on a side of the bearing sleeve 8. Another fixing member 25s is disposed a side of the drive shaft 10. The fixing members 24s and 25s are displaced in the axial direction of the drive shaft 10 with a prescribed space t and in the radial direction. In other words, the fixing member 24s on the holding plate 20 is displaced outwardly in the radial direction of the drive shaft 10 with respect to the fixing member 25s and displaced in the axial direction of the drive shaft 10 as well with respect to the fixing member 25s.

The sealing member is the cloth-inserted rubber 21 in a form of sheet made of rubber and cloth. The cloth-inserted rubber 21 extends inwardly in the radial direction from the fixing member 24s on the cover plate 20, and then is bent to extend in the axial direction to form a straight part 21s and again bent to extend inwardly in the radial direction of the drive shaft 10 to the fixing member 25s on the side of the drive shaft 10. In other words, the cloth-inserted rubber 21 extends in the radial direction from the fixing member 24s on the cover plate 20 and then bend in the axial direction of the drive shaft 10 to form the straight part 21s extending straight in the opposite direction to the rotor head 3 and then again bent to extend inwardly in the radial direction to the fixing member 25s on the drive shaft 10 side.

The fixing member 24s for fixing the cover plate 20 is configured such that a bolt 24 secures a stopper plate 23 and the cloth-inserted rubber 21 to the cover plate 20 via the rubber member 22.

The fixing member 25s is configures that a bolt 24 secures a stopper plate 31 and the cloth-inserted rubber 21 to the side of the drive shaft 10 via the rubber member 22.

According to the first preferred embodiment, the fixing members 24s and 25s are provided for the cover plate 20 fixed to the bearing sleeve 8 and the drive shaft 10 with the external teeth respectively. The cloth-inserted rubber 21 is interposed between the rubber members 22 at a fixed position where each of the fixing members 24s and 25s is mounted.

Accordingly, the pair of fixing members 24s and 25s have rigidity and flexibility and firmly seal the connection part of the cover plate 20 and the cloth-inserted rubber 21 in liquid tight manner. The pair of fixing members 24s and 25s are connected by the sealing member. The sealing member is the cloth-inserted rubber 21 which is bent into a crank shape and installed between the pair of fixing members 24s and 25s.

Therefore, the fixing member 24s on the cover plate 20 fixed to the bearing sleeve 8 and the fixing member 25s for the drive shaft 10 with external teeth are completely vibrationally-independent of each other.

The fixing members 24s and 25s are connected by the bended cloth-inserted rubber 21. Thus, the cloth-inserted rubber absorbs the relative movement between the cover plate 20 and the drive shaft 10 in the axial and radial directions. The fixing members 24s and 25s are vibrationally-independent and thus, restrain of the fixing members 24s and 25s does not affect the cloth-inserted rubber 21.

Figure 7:
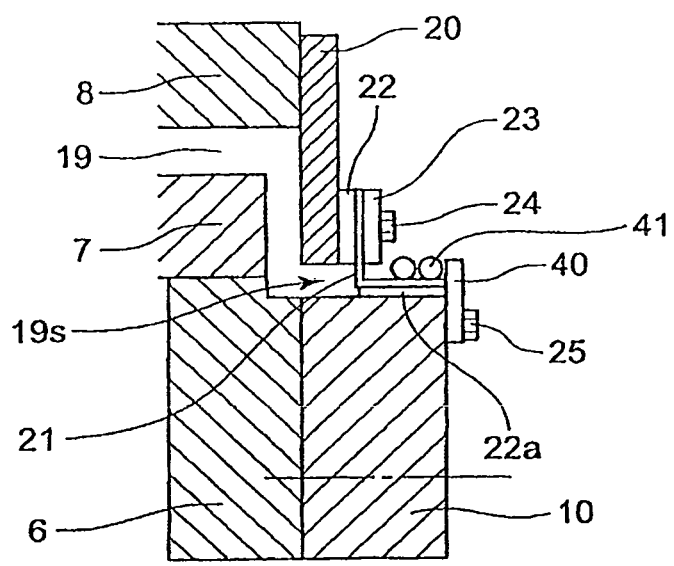
FIG. 7 shows a structure of a storage part for the lubricant in relation to the related art.

According to the first preferred embodiment, the iron band 41 is not required as in the case of the related art (see FIG. 7). The iron band 42 is fixed to the top surface of the drive shaft 10 while applying tensional force. By not using the iron band 41, it is possible to avoid loosening and sliding of the iron band due to the vibration of the surface caused by the relative movement of the iron band in the axial and radial directions.

Particularly, the fixing members 24s and 25s fix the cloth-inserted rubber in a plane perpendicular to the axial direction of the drive shaft 10. With use of the conventional iron band 41 along the outer circumferential surface of the drive shaft, time-related deterioration of the contact pressure of the iron band tends to cause the sliding on the outer circumferential surface of the drive shaft 10 in the axial direction. However, using of the fixing members 24s and 25s instead of the iron band 41 solves such issue.

According to the preferred embodiment, the cloth-inserted rubber 21 absorbs the relative displacement of the cover plate 20 and the drive shaft 10 in the axial and radial directions and the fixing members 24s and 25s are vibrationally-independent and are in a plane perpendicular to the axial direction. Thus, the restrain of each of the fixing members 24s and 25s does not affect the cloth-inserted rubber 21 and the cloth-inserted rubber 21 as a sheet can have sufficient sealing effect, thereby preventing the lubricant from leaking.

The above sealing structure is used in a gear coupling unit of a wind turbine to prevent the lubricant around the gear coupling from leaking. Thus, the gear coupling is maintenance-free.

Further, the gear coupling and the tower can stay clean and thus, it is possible to maintain clean appearance thereof. Specifically, it is possible to prevent the leaking of the lubricant, which leaves stains around the gear coupling as well as in the tower and deteriorates the appearance thereof.

Second Preferred Embodiment

Figure 2:
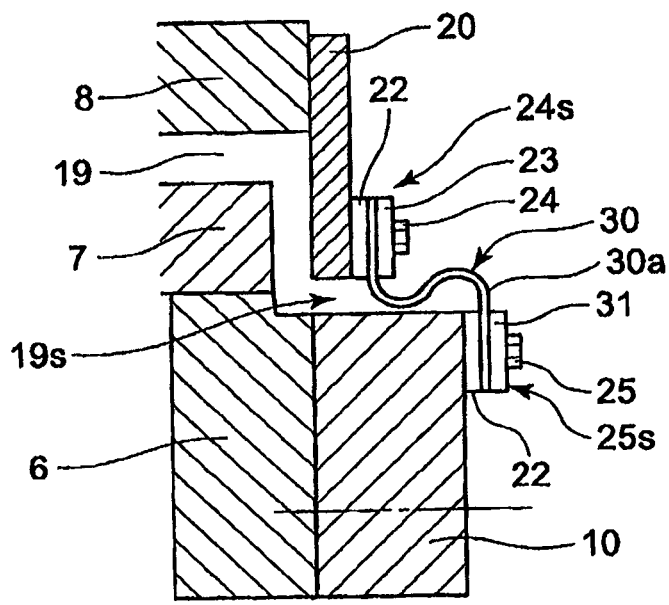
FIG. 2 is an enlarged view of the section Z of FIG. 6, illustrating a structure of a storage part for the lubricant in relation to a second preferred embodiment of the present invention.

FIG. 2 is an enlarged view of a section Z of FIG. 6, illustrating a structure of a storage part for the lubricant in relation to a second preferred embodiment of the present invention.

In the second preferred embodiment, the sealing member is a cloth-inserted rubber 30. The cloth-inserted rubber extends inwardly in the radial direction of the drive shaft 10 from the fixing member 24s on the cover plate 20 of the bearing sleeve 8, then the cloth-inserted rubber is bent to extend in the axial direction of the drive shaft 10 while curving in an S-shape to form a curved part 30a, and then bent again to extend inwardly in the radial direction to reach the fixing member 25s. In other words, the cloth-inserted rubber 30 extends inwardly in the radial direction from the fixing member 24s on the cover plate, curves in an S-shape to extend in the axial direction, and then is bent to extend inwardly in the radial direction to reach the fixing member 25s on the side of the drive shaft 10.

The rest of the structure is the same as the first preferred embodiment and thus, the same reference numbers are used for the parts already described in the first preferred embodiment.

According to the second preferred embodiment, the cloth-inserted rubber 30 as the sealing member is bent inwardly in the radial direction and then curves in S-shape in the axial direction to form the curved part 30a. This increases the flexibility of the cloth-inserted rubber 30. The fixing member 24s on the cover plate 20 fixed to the bearing sleeve 8 with internal teeth and the fixing member 25s on the drive shaft 10 with the external teeth are supported completely vibrationally-independent of each other and thus, the sealing performance of the sheet of the cloth-inserted rubber 30 becomes sufficient and it is possible to prevent the lubricant from leaking from the interior space. The rest of the structure is the same as the first preferred embodiment.

Third Preferred Embodiment

Figure 3:
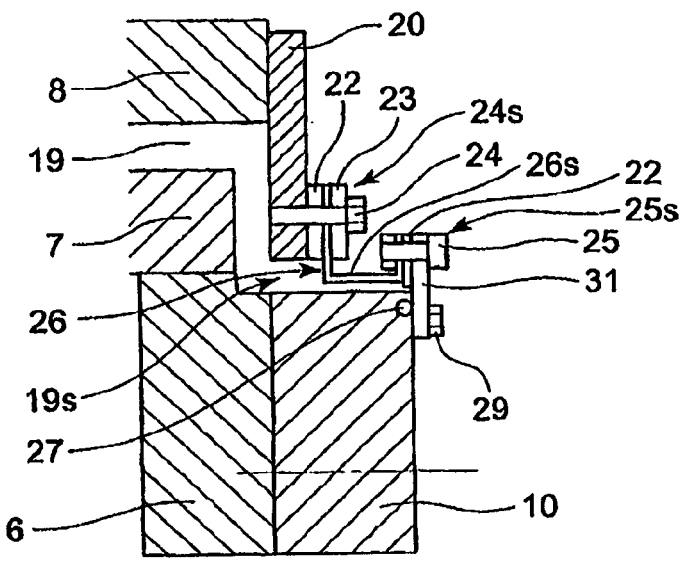
FIG. 3 is an enlarged view of the section Z of FIG. 6, illustrating a structure of a storage part for the lubricant in relation to a third preferred embodiment of the present invention.

FIG. 3 is an enlarged view of a section Z of FIG. 6, illustrating a structure of a storage part for the lubricant in relation to a third preferred embodiment of the present invention.

According to the third preferred embodiment, the fixing member 24s on the cover plate 20 fixed to the side of the bearing sleeve 8 and the fixing member on the side of the drive shaft 10 are displaced in the radial direction and also displaced in the axial direction of the drive shaft 10 with a prescribed distance from each other. The fixing member 25s on the drive shaft 10 side is positioned outwardly in the radial direction with respect to the drive shaft 10. The fixing member 25s is secures on one end of the cloth-inserted rubber 26 to the stopper plate 31 extending outwardly in the radial direction of the drive shaft 10.

The fixing member 24s has the same structure as that of the first preferred embodiment (FIG. 1).

The sealing member is the cloth-inserted rubber 26 made from a sheet of rubber and cloth. The cloth-inserted rubber 26 is formed in U-shape such that the cloth-inserted rubber 26 extends inwardly in the radial direction of the drive shaft 10 from the fixing member 24s on the cover plate 20, then is bent to extend in the axial direction to from a straight part 26s with a certain distance, and then bent again at the end of the straight part 26s to extend outwardly in the radial direction to reach the fixing member 25s. In other words, the cloth-inserted rubber 26 extends inwardly in the radial direction from the fixing member 24s on the cover plate 20, then the cloth-inserted rubber is bent to extend in the axial direction of the drive shaft 10 to form the straight part 26s, and then the cloth-inserted rubber is bent again to extend outwardly in the radial direction of the drive shaft 10 to reach the fixing member 25s on the stopper plate 31.

The fixing member 25s fixes the one end of the cloth-inserted rubber to the stopper plate 31 and is positioned outwardly in the radial direction with respect to the drive shaft 10. The bolt 25 secures the stopper plate 31 and the cloth-inserted rubber 26 to the side of the drive shaft via the rubber member 22.

The cloth-inserted rubber 26 prevents the lubricant from leaking out of the interior space 19s.

As described above, the rubber members 22 are installed at both ends of the cloth-inserted rubber where the fixing member 24s on the cover plate 20 and the fixing member 25s on the side of the drive shaft respectively are respectively fixed.

Between the drive shaft 10 and the stopper plate 31 on the drive shaft 10 side, an O-ring 27 is installed. The bolt 29 is tightened so as to prevent the leaking of the lubricant by means of the cloth-inserted rubber 26 and the O-ring.

The rest of the structure is the same as the first preferred embodiment and thus, the same reference numbers are used for the parts already described in the first preferred embodiment.

According to the third preferred embodiment, with the combination of the flexibility of the U-shaped cloth-inserted rubber 26 and the vibrationally-independent structure of the fixing members 24s and 25s as well as the sealing effect of the cloth-inserted rubber and the O-ring, it is possible to achieve sufficient sealing effect. As a result, the leaking of the lubricant is prevented.

Fourth Preferred Embodiment

Figure 4A:
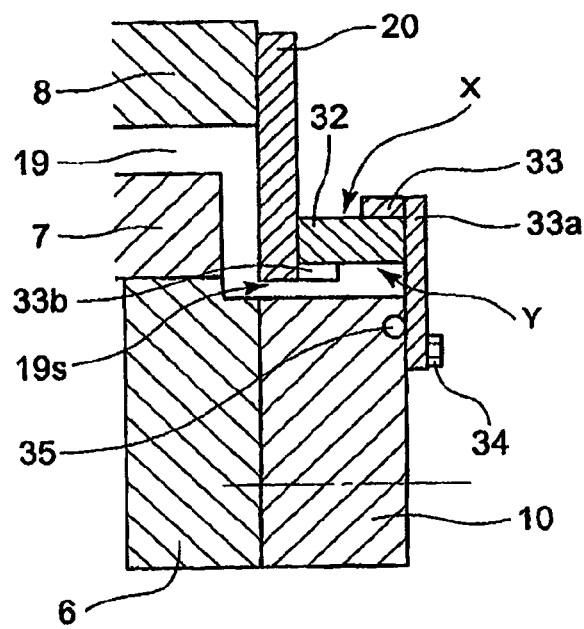
FIG. 4A is an enlarged view of the section Z of FIG. 6, illustrating a structure of a storage part for the lubricant in relation to a fourth preferred embodiment of the present invention.
Figure 4B:
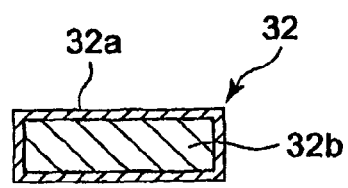
FIG. 4B is an enlarged view of a sponge rubber member of FIG. 4A.

FIG. 4A is an enlarged view of the section Z of FIG. 6, illustrating a structure of a storage part for the lubricant in relation to a fourth preferred embodiment of the present invention. FIG. 4B is an enlarged view of a sponge rubber member of FIG. 4A.

In the fourth preferred embodiment, the sponge rubber member 32 is installed in the axial direction of the drive shaft 10 between the side part of the cover plate 20 and the side part of the drive shaft 10. The sponge rubber member 32 has a rectangular cross-sectional shape formed such that a sponge material 32b is covered by a rubber material 32a. The sponge rubber member 32 is held at both the cover plate 20 side and the drive shaft 10 side in the radial direction of the drive shaft 10 between a lower cover plate 33 disposed on a side of the cover plate 20 and a support plate 33 fixed to the side part of the drive shaft 10 side Further, the sponge rubber member 32, i.e. the cover plate 20 side and the drive shaft 10 side, are held between the cover plate 20 and the stopper plate 33a in the axial direction of the drive shaft 10. In other words, the stopper plate 33a presses the sponge rubber member 32 against the cover plate 20 in the axial direction of the drive shaft 10 so as to fix one end of the sponge rubber member 32 on the drive shaft 10 side to the cover plate 20 in liquid tight manner, thereby functioning as a first fixing member. Meanwhile, the cover plate 20 presses the sponge rubber member 32 against the stopper plate 33a in the axial direction of the drive shaft 10 so as to fix the other end of the sponge rubber member 32 on the cover plate 20 side to the stopper plate 33a in liquid tight manner, thereby functioning as a second fixing member.

The sponge rubber member 32 has a rectangular cross-sectional shape formed such that the sponge material 32b is surrounded by the rubber material 32a. The soft material, the sponge material 32b is covered by a highly-flexible material, the rubber material 32a.

The stopper plate is fixed to the drive shaft 10 by the bolt 34. The O-ring is provided between the stopper plate 33a and the drive shaft 10. The leaking of the lubricant is prevented by the sponge rubber member 32 and the O-ring 35.

The rest of the structure is the same as the first preferred embodiment and thus, the same reference numbers are used for the parts already described in the first preferred embodiment (FIG. 1).

According to the fourth preferred embodiment, the sponge rubber member 32 has a rectangular cross-sectional shape formed such that the highly-flexible sponge material 32b is covered by the soft rubber material 32a.

The sponge rubber member 32 is supported at both ends thereof, that are the cover plate 20 side and the drive shaft 10 side. The O-ring is provided between the stopper plate 33a and the drive shaft 10. As a result, the leaking of the lubricant can be firmly prevented with the combination of the flexibility of the sponge rubber member 32 and the sealing effect of the O-ring.

Fifth Preferred Embodiment

Figure 5:
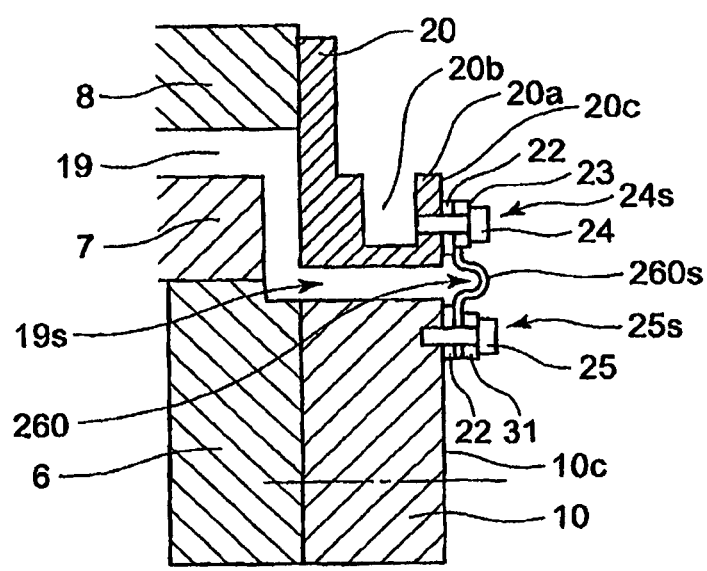
FIG. 5 is an enlarged view of the section Z of FIG. 6, illustrating a structure of a storage part for the lubricant in relation to a fifth preferred embodiment of the present invention.

FIG. 5 is an enlarged view of a section Z of FIG. 6, illustrating a structure of a storage part for the lubricant in relation to a fifth preferred embodiment of the present invention.

According to the fifth preferred embodiment, the cover plate 20 fixed to the side of the bearing sleeve 8 opens upwardly to form an open part 20b of the cover plate 20 and an upper cover part 20a.

A side face 20c of the upper cover part 20a of the cover plate 20 and a side face 10c of the drive shaft 10 are substantially in the same plane perpendicular to the axial direction of the drive shaft 10. The fixing member 24 for the upper cover part 20a is disposed on the side face of the upper cover part 20a. The fixing member 25s for the drive shaft 10 is disposed on the side face 10c of the drive shaft 10. The fixing members 24s and 25s are connected by a sheet of the cloth-inserted rubber 260 made of cloth and rubber. The cloth-inserted rubber 260 curves to protrude in the axial direction of the drive shaft 10 to form a curved part 260s between the fixing members 24s and 25s. Specifically, the fixing member 24s for the upper cover part 20a and the fixing member for the drive shaft 10 are arranged approximately in a plane perpendicular to the axial direction of the drive shaft 10. The cloth-inserted rubber 260 curves to protrude in the axial direction of the drive shaft 10 between the ends thereof.

The rubber members 22 and 22 are installed at the fixing members 24s and 25s where the cloth-inserted rubber 260 is fixed.

The fixing members 24s and 25s have the same structure as those of the first preferred embodiment.

The rest of the structure is the same as the first preferred embodiment and thus, the same reference numbers are used for the parts already described in the first preferred embodiment.

According to the fifth preferred embodiment, the side face 20c of the upper cover part 20a fixed to the side part of the side of the bearing sleeve 8 and the side face 10c of the drive shaft 10 are arranged in a plane perpendicular to the axial direction of the drive shaft 10. Further, the fixing member 24s for the upper cover part 20a and the fixing member 25s for the drive shaft 10 are connected by the cloth-inserted rubber 260. The cloth-inserted rubber 260 curves to protrude in the axial direction of the drive shaft 10 to form a curved part 260s between the fixing members 24s and 25s. Specifically, the fixing member 24s for the upper cover part 20a and the fixing member for the drive shaft 10 are arranged approximately in a plane perpendicular to the axial direction of the drive shaft 10.

The cloth-inserted rubber 260 is formed with the curved part 260s and thus, the flexibility of the movement of the cloth-inserted rubber 260 is increased in both the axial and radial directions. As a result, it is possible to further prevent the leaking of the lubricant.

According to the present invention, it is possible to provide a lubricant sealing structure for a gear coupling. The lubricant sealing structure firmly prevents the leaking of the lubricant due to movements such as vibration in the axial and radial directions of the drive shaft inside the gear coupling.

The invention claimed is:
1. A lubricant sealing structure for a gear coupling which is disposed between a rotation shaft and a drive shaft and which includes an outer ring formed with internal teeth meshing with external teeth on outer circumferential surfaces of the rotation shaft and the drive shaft, the structure comprising:
   a sealing member having flexibility;
   a cover plate which is attached to a sleeve fixed to the rotation shaft and disposed around the outer ring, the cover plate being provided separately from the outer ring to face and cover a side surface of the outer ring;
   a first fixing member which fixes a first end of the sealing member to the cover plate in a liquid-tight manner by pressing the first end of the sealing member against the cover plate in an axial direction of the drive shaft; and a second fixing member which fixes a second end of the sealing member to one of the drive shaft and a stopper plate secured to the drive shaft in a liquid-tight manner by pressing the second end of the sealing member against the one of the drive shaft and the stopper plate in the axial direction of the drive shaft, wherein the first end of the sealing member has a first sealing face extending along a radial direction of the drive shaft and facing the cover plate, and the second end of the sealing member has a second sealing face extending along the radial direction and facing the one of the drive shaft and the stopper plate, wherein the sealing member is configured to seal lubricant stored in a lubricant-reservoir space inside the first and second sealing faces, and the lubricant-reservoir space includes an interior space inside the gear coupling, and an outside space formed outside the gear coupling and disposed between the outer ring and the sleeve, wherein the sealing member comprises a central part between the first end and the second end, and the central part of the sealing member is disposed radially outside the drive shaft, wherein the central part of the sealing member forms another space communicating with the lubricant-reservoir space and located between an inner circumferential surface of the cover plate and an end of an outer circumferential surface of the drive shaft, and wherein the another space extends from the first sealing face which faces the surface of the cover plate to the second sealing face along the radial direction of the drive shaft so that the first sealing face and the second sealing face are exposed to the another space.

2. The lubricant sealing structure for the gear coupling according to claim 1, wherein the second fixing member fixes the second end of the sealing member including the second sealing face along an end face of the drive shaft to an end face of the drive shaft, wherein the first fixing member is displaced outwardly in the radial direction of the drive shaft with respect to the second fixing member and displaced in the axial direction of the drive shaft with respect to the second fixing member, and wherein the sealing member comprises a first part which has the first sealing face and which extends inwardly in the radial direction of the drive shaft from the first fixing member, a second part which has one end connected to the first part and which extends from the one end to other end in the axial direction of the drive shaft, and a third part which has the second sealing face and which is connected to the other end of the second part, the third part extending from the other end of the second part inwardly in the radial direction of the drive shaft to reach the second fixing member.

3. The lubricant sealing structure for the gear coupling according to claim 1, wherein the second fixing member fixes the second end of the sealing member including the second sealing face along an end face of the drive shaft to the end face of the drive shaft, wherein the first fixing member is displaced outwardly in the radial direction of the drive shaft with respect to the second fixing member and displaced in the axial direction of the drive shaft with respect to the second fixing member, and wherein the sealing member comprises a first part which has the first sealing face and which extends inwardly in the radial direction of the drive shaft from the first fixing member, a second part which has one end connected to the first part and which extends from the one end to other end in the axial direction of the drive shaft while curving in an S-shape, and a third part which has the second sealing face and which is connected to the other end of the second part, the third part extending from the other end of the second part inwardly in the radial direction of the drive shaft to reach the second fixing member.

4. The lubricant sealing structure for the gear coupling according to claim 1, wherein the second fixing member fixes the second end of the sealing member to the stopper plate that extends outwardly in the radial direction from the drive shaft, the second fixing member being positioned outwardly in the radial direction of the drive shaft with respect to the drive shaft, wherein the first fixing member is displaced in both of the radial and axial directions of the drive shaft with respect to the second fixing member, and wherein the sealing member comprises a first part which has the first sealing face and which extends inwardly in the radial direction of the drive shaft from the first fixing member, a second part which has one end connected to the first part and which extends from the one end to the other end in the axial direction of the drive shaft, and a third part which has the second sealing face and which is connected to the other end of the second part, the third part extending from the other end of the second part outwardly in the radial direction of the drive shaft to reach the second fixing member.

5. The lubricant sealing structure for the gear coupling according to claim 1, wherein the second fixing member fixes the second end of the sealing member to the stopper plate that extends outwardly in the radial direction from the drive shaft, the second fixing member being positioned outwardly in the radial direction of the drive shaft with respect to the drive shaft, wherein the first fixing member is displaced in both of the radial and axial directions of the drive shaft with respect to the second fixing member, wherein the sealing member is a sponge-rubber member which is made of a sponge material and a rubber material surrounding the sponge material and has a rectangular cross-sectional shape, wherein the sponge-rubber member extends in the axial direction of the drive shaft between the cover plate and the stopper plate so as to be nipped by the cover plate and the stopper plate, the sponge-rubber member having the first sealing face contacting with the cover plate and the second sealing face contacting with the stopper plate, and wherein the stopper plate works as the first fixing member and the cover plate works as the second fixing member.

6. The lubricant sealing structure for the gear coupling according to claim 1, further comprising an O-ring provided between the stopper plate and the drive shaft, wherein the stopper plate extends outwardly in the radial direction from the drive shaft, and wherein the second fixing member is positioned outwardly in the radial direction of the drive shaft with respect to the drive shaft to fix the second end of the sealing member to the stopper plate.

7. The lubricant sealing structure for the gear coupling according to claim 1, wherein the first and second fixing members are substantially arranged in a plane perpendicular to the axial direction of the drive shaft, wherein the sealing member is a cloth-inserted rubber sheet made of rubber and cloth, and wherein the cloth-inserted rubber sheet curves to protrude in the axial direction of the drive shaft between the first end and the second end.

8. The lubricant sealing structure for the gear coupling according to claim 1, further comprising a rubber member which is provided at least one of between the first fixing member and the cover plate and between the second fixing member and the one of the drive shaft and the stopper plate.

9. The lubricant sealing structure for the gear coupling according to claim 1, wherein the sealing member is disposed apart from the drive shaft to define the space for storing lubricant for the internal teeth and the external teeth.

10. A lubricant sealing structure for a gear coupling which is disposed between a rotation shaft and a drive shaft and which includes an outer ring formed with internal teeth meshing with external teeth on outer circumferential surfaces of the rotation shaft and the drive shaft, the structure comprising:

a sealing member having a first end portion, a second end portion parallel to the first portion and a middle portion between the first end portion and the second end portion;

a cover plate which is attached to a sleeve fixed to the rotation shaft and disposed around the outer ring, the cover plate being provided separately from the outer ring to face and cover a side surface of the outer ring;

a first fixing member having a first bolt and a first stopper plate arranged on the first end portion of the sealing member, the first bolt being fixed to the cover plate to sandwich the first end portion of the sealing member between the first stopper plate and the cover plate; and a second fixing member having a second bolt and a second stopper plate arranged on the second end portion of the sealing member, the second bolt being fixed to the drive shaft to sandwich the second end portion of the sealing member between the second stopper plate and the drive shaft;

wherein the first and the second end portions of the sealing member extend along a radial direction of the drive shaft to form first and second sealing faces, respectively, wherein the sealing member is configured to seal lubricant stored in a lubricant-reservoir space inside the first and the second sealing faces, the lubricant-reservoir space includes an interior space inside the gear coupling, and an outside space formed outside the gear coupling and disposed between the outer ring and the sleeve, wherein the middle portion of the sealing member is disposed radially outside the drive shaft, wherein the middle portion of the sealing member at least partially form another space communicating with the lubricant-reservoir space and located between an inner circumferential surface of the cover plate and an outer circumferential surface of the drive shaft, and wherein the another space extends from the first sealing face which faces the surface of the cover plate to the second sealing face along the radial direction of the drive shaft so that the first sealing face and the second sealing face are exposed to the space.

11. The lubricant sealing structure for the gear coupling according to claim 10, wherein the first fixing member further includes a first rubber member arranged between the cover plate and the first end portion of the sealing member, and the second fixing member further includes a second rubber member arranged between the drive shaft and the second end portion of the sealing member.

12. The lubricant sealing structure for the gear coupling according to claim 2, wherein the sealing member is a cloth inserted rubber sheet made of rubber and cloth.

13. The lubricant sealing structure for the gear coupling according to claim 3, wherein the sealing member is a cloth inserted rubber sheet made of rubber and cloth.

14. The lubricant sealing structure for the gear coupling according to claim 4, wherein the sealing member is a cloth inserted rubber sheet made of rubber and cloth.

15. The lubricant sealing structure for the gear coupling according to claim 1, wherein the second fixing member is configured to axially press the second end of the sealing member against an outer circumferential region of one end of the drive shaft that is farther from the rotation shaft than the other end of the drive shaft, and wherein the second sealing face of the sealing member is arranged to face the outer circumferential region of said one end of the drive shaft.

16. The lubricant sealing structure for the gear coupling according to claim 1, wherein the stopper plate is fixed to an outer circumferential region of one end of the drive shaft that is farther from the rotation shaft than the other end of the drive shaft, wherein the second fixing member is configured to axially press the second end of the sealing member against the stopper plate at a position radially outward with respect to the outer circumferential region of said one end of the drive shaft, and wherein the second sealing face of the sealing member is arranged to face the outer circumferential region of said one end of the drive shaft.

17. The lubricant sealing structure for the gear coupling according to claim 1, wherein the another space extends from the end of the outer circumferential surface of the drive shaft over the entire outer circumferential surface and is defined between the outer circumferential surface and the central part of the sealing member to only retain the lubricant therein.

18. The lubricant sealing structure for the gear coupling according to claim 10, wherein the another space extends from the end of the outer circumferential surface of the drive shaft over the entire outer circumferential surface and is defined between the outer circumferential surface and the middle portion of the sealing member to only retain the lubricant therein.

* * * * *